(12) United States Patent
Ding et al.

(10) Patent No.: US 9,860,180 B2
(45) Date of Patent: Jan. 2, 2018

(54) MULTI-LEVEL FLOW TABLE SEARCH METHOD AND APPARATUS

(71) Applicant: Huawei Technologies Co., Ltd., Shenzhen (CN)

(72) Inventors: Wanfu Ding, Shenzhen (CN); Chengyong Lin, Beijing (CN); Gaogang Xie, Beijing (CN); Hongtao Guan, Beijing (CN); Kun Huang, Beijing (CN); Jixing Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 14/980,102

(22) Filed: Dec. 28, 2015

(65) Prior Publication Data

US 2016/0112329 A1    Apr. 21, 2016

Related U.S. Application Data

(63) Continuation of application No. PCT/CN2014/081087, filed on Jun. 30, 2014.

(30) Foreign Application Priority Data

Jun. 28, 2013    (CN) .......................... 2013 1 0269726

(51) Int. Cl.
*H04L 12/28*    (2006.01)
*H04L 12/851*    (2013.01)
(Continued)

(52) U.S. Cl.
CPC ...... *H04L 47/2441* (2013.01); *H04L 12/6418* (2013.01); *H04L 45/745* (2013.01); *H04L 47/35* (2013.01); *H04L 45/54* (2013.01)

(58) Field of Classification Search
CPC ....................................................... H04L 12/56
(Continued)

(56) References Cited

U.S. PATENT DOCUMENTS 7,389,462 B1 *   6/2008   Wang ...................... H04L 1/188
                                                                  714/748
2007/0011734 A1   1/2007   Balakrishnan et al.
(Continued)

FOREIGN PATENT DOCUMENTS

CN    101247337 A    8/2008
CN    102957603 A    3/2013
(Continued)

OTHER PUBLICATIONS

Open Networking Foundation, "OpenFlow Switch Specification," version 1.2 (Wire Protocol oxo3), ONF TS-003Dec. 5, 2011, 85 pages.
(Continued)

*Primary Examiner* — Iqbal Zaidi
(74) *Attorney, Agent, or Firm* — Slater Matsil, LLP

(57) ABSTRACT

A multi-level flow table search method includes extracting matching information of a data packet when the data packet is received and selecting a keyword from the matching information of the data packet according to flow-table match-field configuration information. The method also includes searching for a match field of each-level flow table in a multi-level flow table starting from a first-level flow table in the multi-level flow table by using the keyword as a search keyword, and matching the search keyword with the match field. If matching of a match field of a current-level flow table is completed, the method includes executing a corresponding instruction, and if the current-level flow table is not a last-level flow table or there is an instruction for executing an action, executing a corresponding action.

6 Claims, 7 Drawing Sheets

(51) Int. Cl.
*H04L 12/64* (2006.01)
*H04L 12/801* (2013.01)
*H04L 12/741* (2013.01)

(58) Field of Classification Search
USPC .................................................. 370/389–503
See application file for complete search history.

(56) References Cited

U.S. PATENT DOCUMENTS

| | | |
|---|---|---|
| 2008/0019360 A1 | 1/2008 | Belgaied et al. |
| 2008/0285571 A1* | 11/2008 | Arulambalam ... H04L 29/06027 370/400 |
| 2013/0010600 A1 | 1/2013 | Jocha et al. |
| 2013/0163426 A1 | 6/2013 | Beliveau et al. |
| 2014/0098813 A1* | 4/2014 | Mishra .................. H04L 12/185 370/390 |

FOREIGN PATENT DOCUMENTS

| | | |
|---|---|---|
| CN | 103095583 A | 5/2013 |
| CN | 103354522 A | 10/2013 |

OTHER PUBLICATIONS

Open Networking Foundation, "OpenFlow Switch Specification," version 1.1.0 Implemented (Wire Protocol 0x02), Feb. 28, 2011, 58 pages.
Open Networking Foundation, "OpenFlow Switch Specification," Version 1.3.2 (Wire Protocol 0x04), Apr. 25, 2013, ONF-TS-009, 131 pages.

* cited by examiner

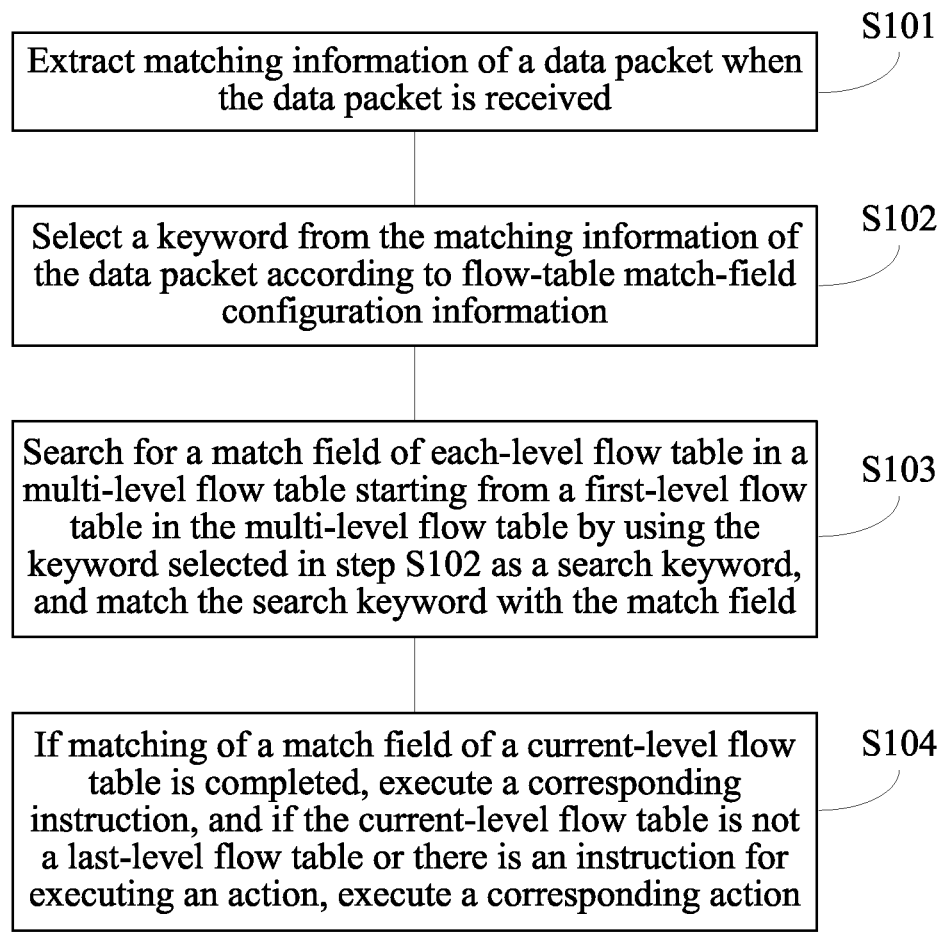
FIG. 1-a

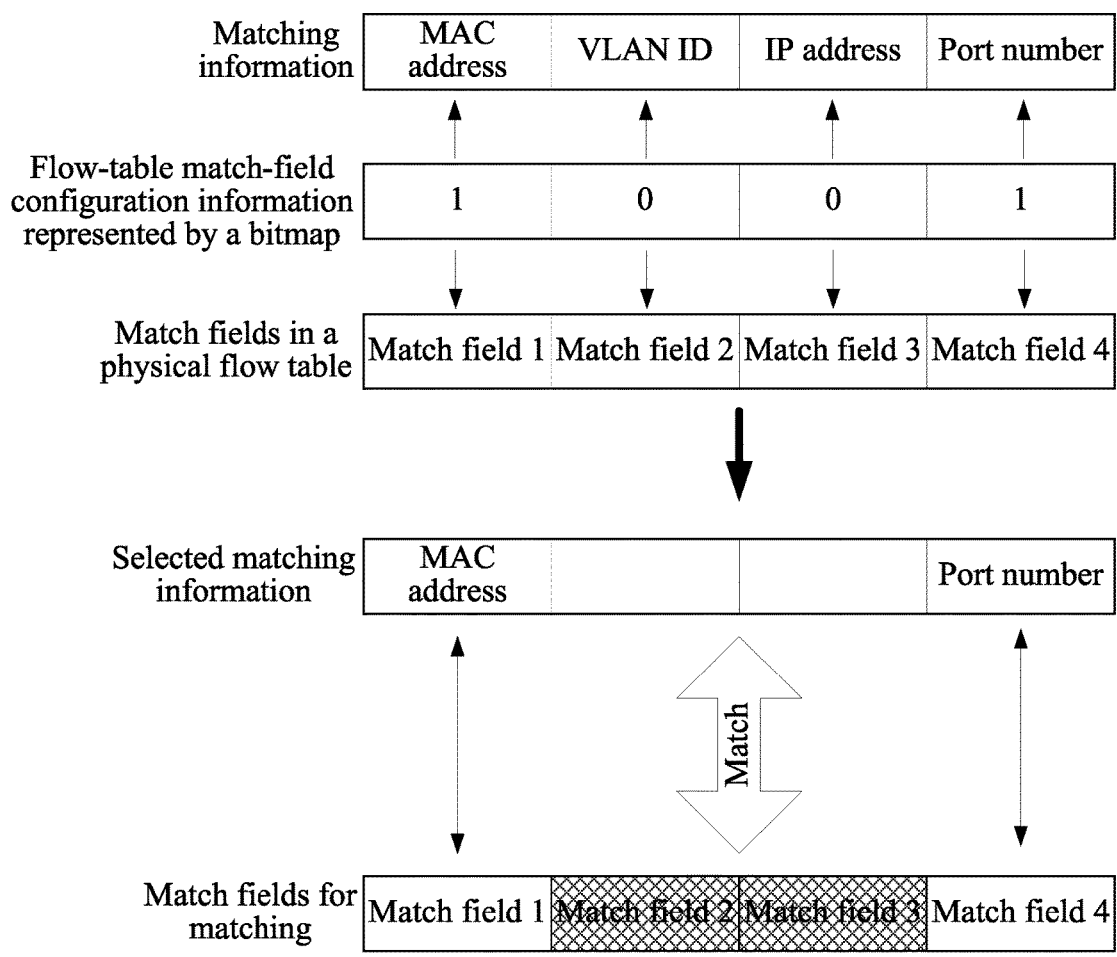
FIG. 1-b

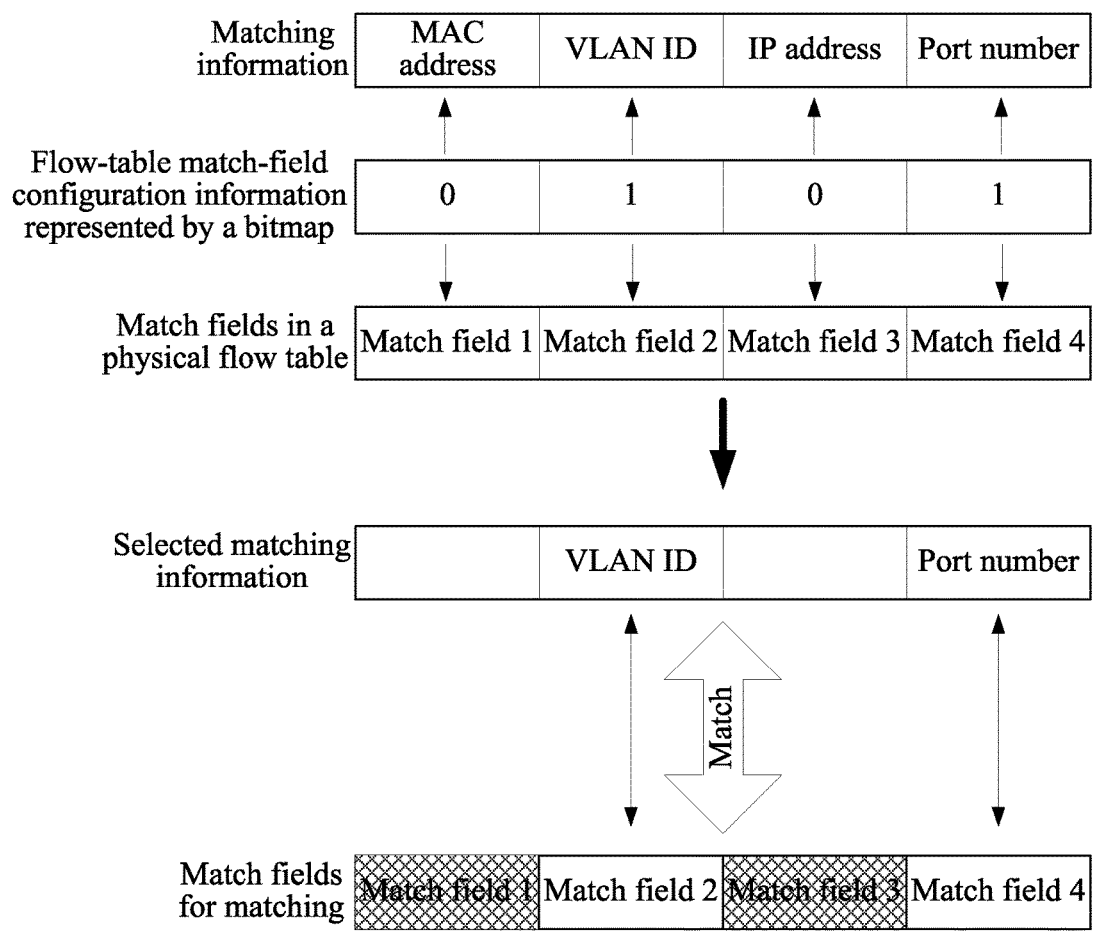
FIG. 1-c

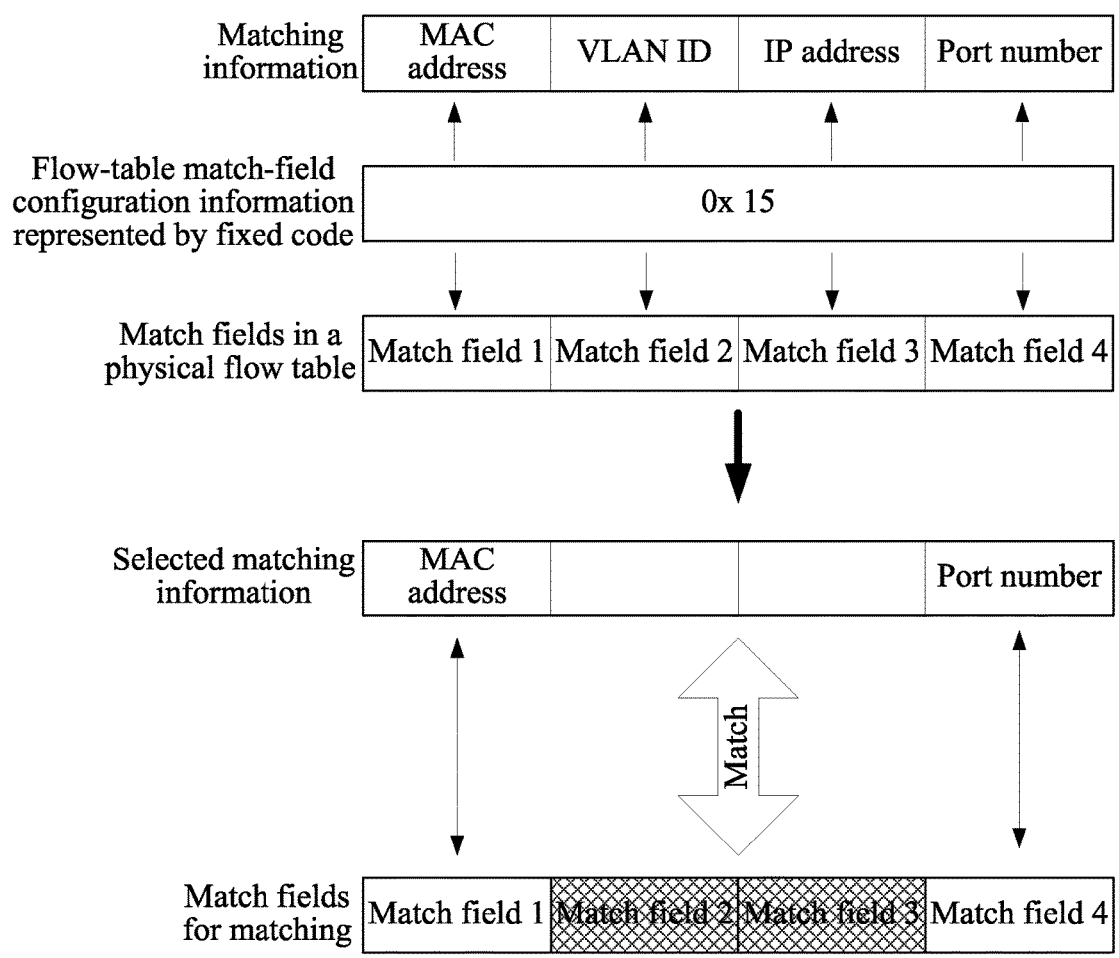
FIG. 1-d

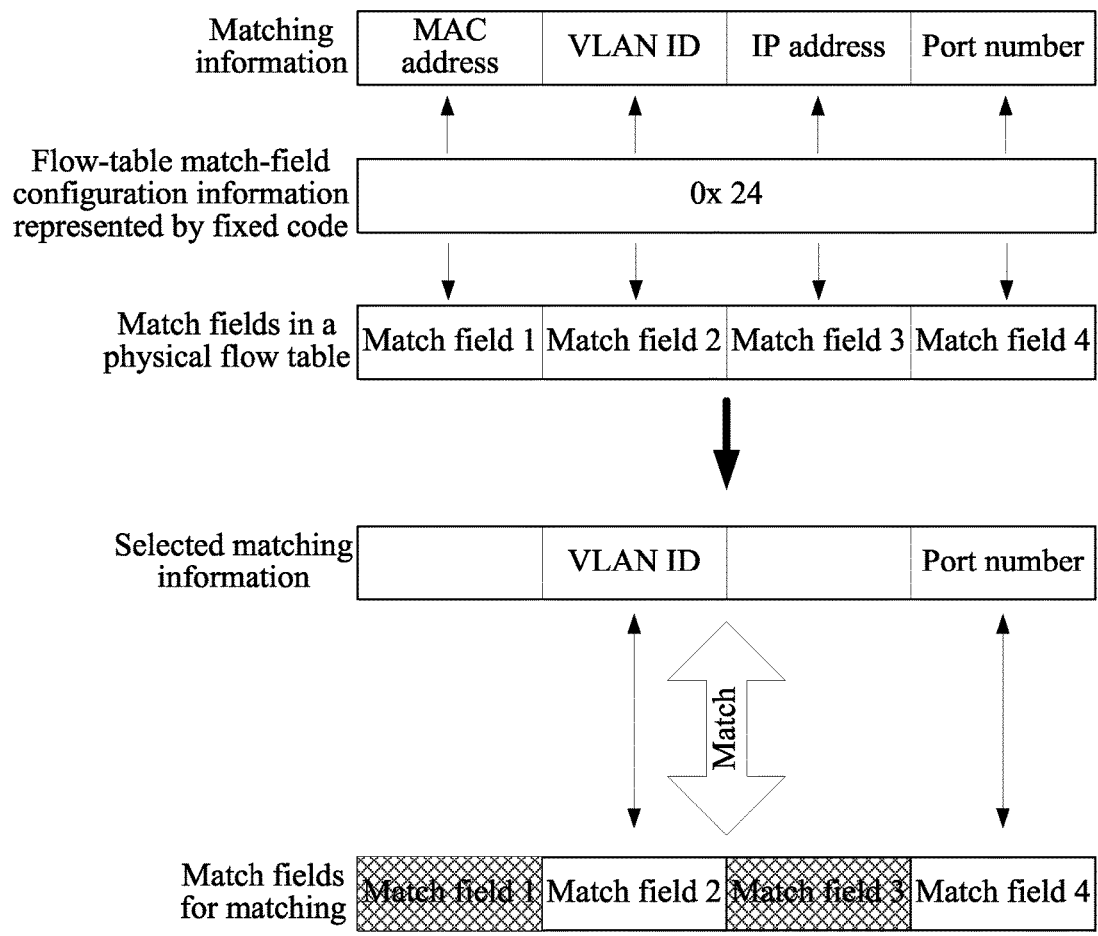
FIG. 1-e
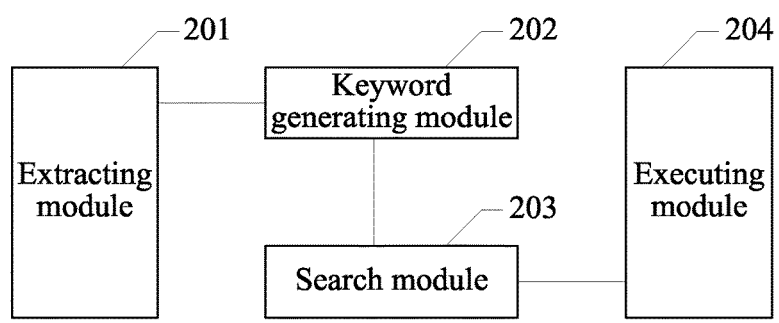
FIG. 2

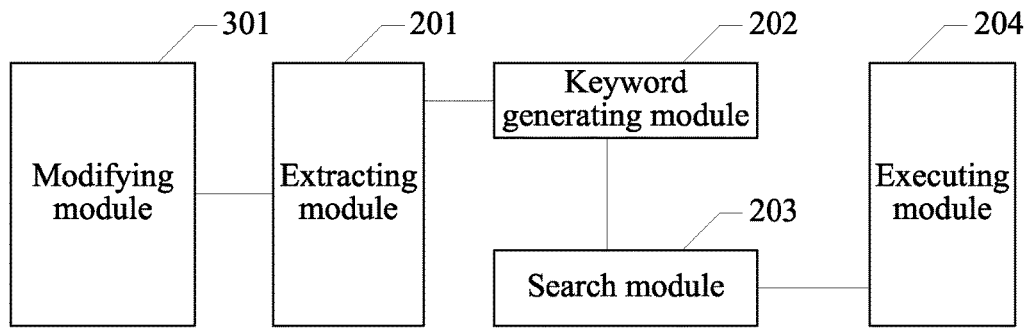
FIG. 3
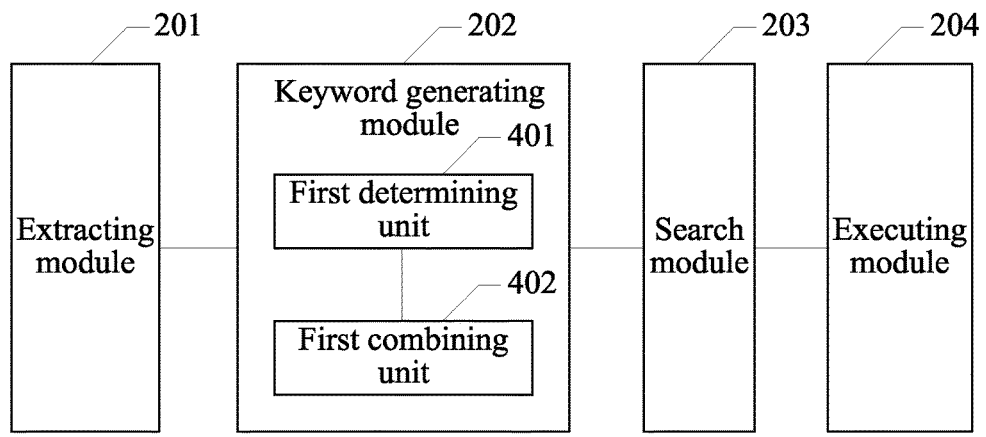
FIG. 4-a
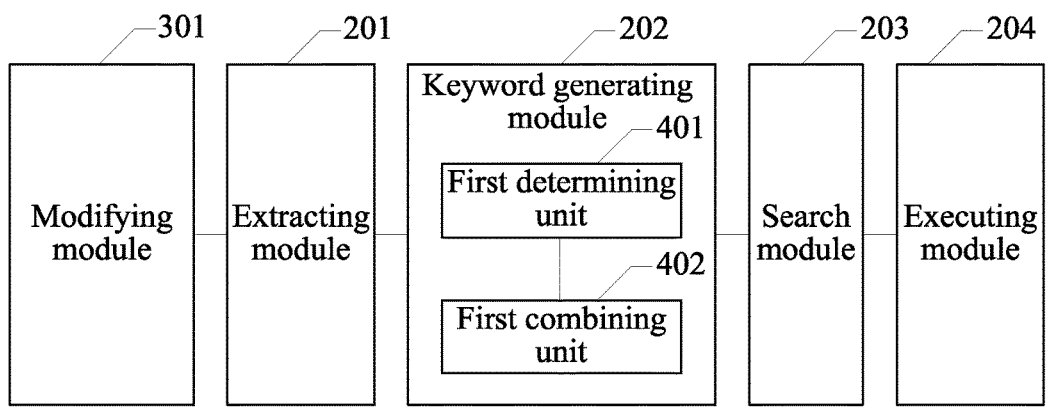
FIG. 4-b

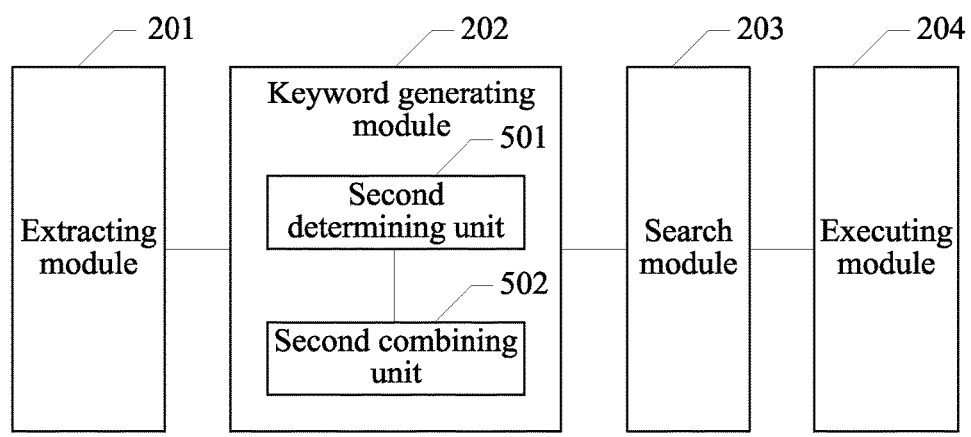
FIG. 5-a
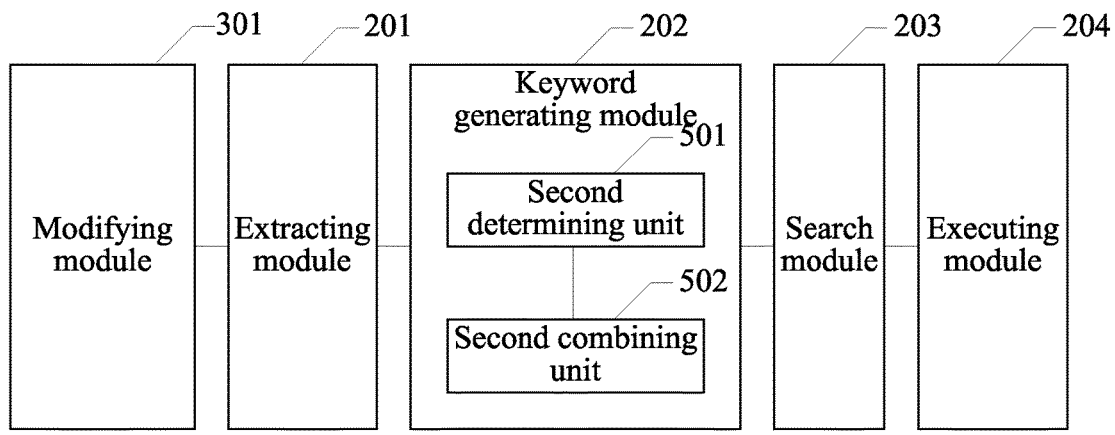
FIG. 5-b

MULTI-LEVEL FLOW TABLE SEARCH METHOD AND APPARATUS

This application is a continuation of International Application No. PCT/CN2014/081087, filed on Jun. 30, 2014, which claims priority to Chinese Patent Application No. 201310269726.0, filed on Jun. 28, 2013, both of which are hereby incorporated by reference in their entireties.

TECHNICAL FIELD

The application relates to the field of communications, and in particular, to a multi-level flow table search method and apparatus.

BACKGROUND

With the development of new technologies of network devices, especially for support of programmability and virtualization, the development of network devices trends toward separation of a control plane from a data plane. As one of the technologies, OpenFlow draws widespread attention. An OpenFlow network consists of three parts: an OpenFlow switch, a FlowVisor, and a controller. The OpenFlow switch is a core component of the entire OpenFlow network, and mainly manages forwarding of a data layer. The FlowVisor performs virtualization on the network. The Controller performs centralized control on the network to implement a function of a control layer. After receiving a data packet, the OpenFlow switch first searches a local flow table for a forwarding destination port, and forwards the data packet to the controller if no match is found, and the control layer decides a forwarding port. OpenFlow implements data forwarding on an OpenFlow switch, and implements data forwarding control on a controller, thereby implementing separation of a data forwarding layer from a control layer.

It can be seen from the foregoing process of processing a data packet in an OpenFlow network that, searching a flow table is an important step. Generally, there are more than one local flow tables, and multiple flow tables are cascaded to form a multi-level flow table. Match fields of an existing multi-level flow table are all fixed multi-level flow-table match fields, where each flow table of the multi-level flow table has a fixed match field. Each flow table has an independent search unit. Once a data packet arrives, a search unit searches a flow table corresponding to the data packet, then obtains an ID of a next flow table by means of search, determines the next flow table to be skipped to, and adds an action corresponding to a search result to an instruction set. Flow table skipping may be skipping over a flow table. According to the stipulation in the OpenFlow protocol, each time after matching is performed on a flow table, an ID of a next flow table may be specified, as long as the ID is greater than an ID of a current table. For example, it is specified that a matching result of a flow table 1 is to skip to a flow table 3; therefore, the flow table 1 may skip over a flow table 2 and directly skip to the flow table 3.

A main disadvantage of the foregoing existing multi-level flow table search method lies in lack of flexibility, because each single flow table in a multi-level flow table has a fixed match field, and hardware logic needs to be modified each time a match field is modified.

SUMMARY

Embodiments of the application provide a multi-level flow table search method and apparatus, to improve flexibility of configuration of a flow table match field.

According to a first aspect, the application provides a multi-level flow table search method, where the method includes: extracting matching information of a data packet when the data packet is received; selecting a keyword from the matching information of the data packet according to flow-table match-field configuration information; searching for a match field of each-level flow table in a multi-level flow table starting from a first-level flow table in the multi-level flow table by using the keyword as a search keyword, and matching the search keyword with the match field; and if matching of a match field of a current-level flow table is completed, executing a corresponding instruction, and if the current-level flow table is not a last-level flow table or there is an instruction for executing an action, executing a corresponding action.

Optionally, after the executing a corresponding instruction and action, the method further includes: modifying the extracted matching information of the data packet.

Optionally, the selecting a keyword from the matching information of the data packet includes: determining matching information, which is used for flow table match field matching, in the matching information of the data packet according to the flow-table match-field configuration information represented by a bitmap; and forming the keyword by using the determined matching information.

Optionally, the selecting a keyword from the matching information of the data packet includes: determining matching information, which is used for flow table match field matching, in the matching information of the data packet according to the flow-table match-field configuration information represented by fixed code; and forming the keyword by using the determined matching information.

According to a second aspect, the application provides a multi-level flow table search apparatus, where the apparatus includes: an extracting module, configured to extract matching information of a data packet when the data packet is received; a keyword generating module, configured to select a keyword from the matching information of the data packet according to flow-table match-field configuration information; a search module, configured to search for a match field of each-level flow table in a multi-level flow table starting from a first-level flow table in the multi-level flow table by using the keyword as a search keyword, and match the search keyword with the match field; and an executing module, configured to: if matching of a match field of a current-level flow table is completed, execute a corresponding instruction, and if the current-level flow table is not a last-level flow table or there is an instruction for executing an action, execute a corresponding action.

Optionally, the apparatus further includes: a modifying module, configured to modify the extracted matching information of the data packet.

Optionally, the keyword generating module includes: a first determining unit, configured to determine matching information, which is used for flow table match field matching, in the matching information of the data packet according to the flow-table match-field configuration information represented by a bitmap; and a first combining unit, configured to form the keyword by using the determined matching information.

Optionally, the keyword generating module includes: a second determining unit, configured to determine matching information, which is used for flow table match field matching, in the matching information of the data packet according to the flow-table match-field configuration information represented by fixed code; and a second combining unit, configured to form the keyword by using the determined matching information.

It can be seen from the foregoing embodiments of the application that, because flow-table match-field configuration information is information that can be modified according to a requirement by using software, hardware logic does not need to be modified to change a flow table match field, and a keyword generated according to the flow-table match-field configuration information is matched with a match field in each-level flow table in a multi-level flow table. Compared with the prior art in which each single flow table in a multi-level flow table has a fixed match field and hardware logic needs to be modified each time a match field is changed, in the method provided in the embodiments of the application, because flow-table match-field configuration information can be configured by using software, a fixed match field becomes a changeable match field. Therefore, flexibility of a flow table match field is improved, and costs incurred by modifying hardware logic when a match field is changed are reduced.

BRIEF DESCRIPTION OF THE DRAWINGS

To describe the technical solutions in the embodiments of the application more clearly, the following briefly introduces the accompanying drawings required for describing the embodiments. Apparently, the accompanying drawings in the following description show merely some embodiments of the application, and a person skilled in the art may still derive other drawings from these accompanying drawings.

FIG. 1-*a* is a schematic flowchart of a multi-level flow table search method according to an embodiment of the application;

FIG. 1-*b* is a schematic diagram of matching in a multi-level flow table search method according to an embodiment of the application;

FIG. 1-*c* is a schematic diagram of matching in a multi-level flow table search method according to another embodiment of the application;

FIG. 1-*d* is a schematic diagram of matching in a multi-level flow table search method according to another embodiment of the application;

FIG. 1-*e* is a schematic diagram of matching in a multi-level flow table search method according to another embodiment of the application;

FIG. 2 is a schematic structural diagram of a multi-level flow table search apparatus according to an embodiment of the application;

FIG. 3 is a schematic structural diagram of a multi-level flow table search apparatus according to another embodiment of the application;

FIG. 4-*a* is a schematic structural diagram of a multi-level flow table search apparatus according to another embodiment of the application;

FIG. 4-*b* is a schematic structural diagram of a multi-level flow table search apparatus according to another embodiment of the application;

FIG. 5-*a* is a schematic structural diagram of a multi-level flow table search apparatus according to another embodiment of the application; and FIG. 5-*b* is a schematic structural diagram of a multi-level flow table search apparatus according to another embodiment of the application.

DETAILED DESCRIPTION OF ILLUSTRATIVE EMBODIMENTS

The following clearly describes the technical solutions in the embodiments of the application with reference to the accompanying drawings in the embodiments of the application. Apparently, the described embodiments are merely some but not all of the embodiments of the application. All other embodiments obtained by a person skilled in the art based on the embodiments of the application shall fall within the protection scope of the application.

FIG. 1-*a* is a schematic flowchart of a multi-level flow table search method according to an embodiment of the application. The method mainly includes S101, S102, S103, and S104, which are described in detail as follows.

S101: Extract matching information of a data packet when the data packet is received.

Matching information of a data packet is information, which is to be matched with content of a match field in a flow table, in the data packet. The so-called flow table includes multiple flow entries, and each flow entry is a forwarding rule. For a data packet entering a switch, a forwarding destination port is obtained by querying a flow table. A flow entry includes a header field, a counter, and an operation. The header field, which is an information tuple such as a quintet, is an identifier of the flow entry, and is also a match field of a flow table. Content of the header field is specific information to be matched with extracted matching information of a data packet. The counter is used to collect statistical data of the flow entry. The operation specifies an operation that should be executed on a data packet matching the flow entry. In the prior art, matching information of a data packet is extracted according to a fixed match field of a single flow table each time; therefore, extraction needs to be performed for multiple times. In contrast, in this embodiment of the application, as an exemplary embodiment in which extracting all matching information of a data packet when the data packet is received may be extracting all the matching information of the data packet when the data packet is received, the exemplary embodiment may be extracting all the matching information of the data packet when the data packet is received, where all the matching information may exist in a form of a data structure.

S102: Select a keyword from the matching information of the data packet according to flow-table match-field configuration information.

In the prior art, a match field of each flow table in a multi-level flow table is fixed; as reflected in hardware, fixed storage spaces are allocated to match fields of these flow tables. If a match field of a flow table needs to be changed, hardware logic needs to be modified, for example, an overall storage space is reallocated, which undoubtedly increases costs. For example, in a multi-level flow table that includes three flow tables, specific content of a match field of a first-level flow table is an IP address; specific content of a match field of a second-level flow table is a MAC address; and specific content of a match field of a third-level flow table is a VLAN ID. If the specific content of the match field of the first-level flow table needs to be changed to a port number, this can be implemented only by modifying specific hardware logic, for example, re-modifying a storage space originally allocated to the match field of the first-level flow table.

In this embodiment of the application, a storage space is allocated to a match field in each flow table, and once allocation of the storage space is completed, the match field remains unchanged unless hardware logic is modified; however, a match field, which is to be matched with matching information of a data packet, in a flow table may be identified by using software, and this action is completed by using flow-table match-field configuration information in this embodiment of the application. The flow-table match-field configuration information may be configured by using software, and therefore, although the match field of the flow table is fixed, the match field, which is to be matched with the matching information of the data packet, in the flow table can be changed according to a change of the flow-table match-field configuration information. It should be noted that both a flow table in the prior art and a "flow table" involved in identifying a match field, which is to be matched with matching information of a data packet, in the flow table by using software in this embodiment of the application are physical flow tables, that is, a physical flow table is corresponding to a fixed physical storage space. In this respect, the flow-table match-field configuration information mentioned in this embodiment of the application is specifically used to identify a match field, which is to be matched with selected matching information, in a physical flow table by using software.

When extracting all matching information of a data packet when the data packet is received is used as an exemplary embodiment of extracting matching information of the data packet when the data packet is received, and the flow-table match-field configuration information is used to identify a match field, which is to be matched with selected matching information, in a physical flow table by using software, an embodiment of the selecting the keyword from the matching information of the data packet according to the flow-table match-field configuration information may be: generating the keyword by selecting several pieces of matching information from all the matching information of the data packet according to the flow-table match-field configuration information.

S103: Search for a match field of each-level flow table in a multi-level flow table starting from a first-level flow table in the multi-level flow table by using the keyword selected in step S102 as a search keyword, and match the search keyword with the match field.

S104: If matching of a match field of a current-level flow table is completed, execute a corresponding instruction, and if the current-level flow table is not a last-level flow table or there is an instruction for executing an action, execute a corresponding action.

When an embodiment of the foregoing S101 and S102 is: extracting all the matching information of the data packet when the data packet is received and generating the keyword by selecting several pieces of matching information from all the matching information of the data packet according to the flow-table match-field configuration information, as an exemplary embodiment of the application, the searching for a match field of each-level flow table in a multi-level flow table starting from a first-level flow table in the multi-level flow table by using the keyword selected in S102 as a search keyword, and matching the search keyword with the match field; and if matching of a match field of a current-level flow table is completed, executing a corresponding instruction, and if the current-level flow table is not a last-level flow table or there is an instruction for executing an action, executing a corresponding action may be: searching for a match field of each-level logical flow table in a multi-level logical flow table starting from a first-level logical flow table in the multi-level logical flow table by using the keyword as a search keyword, and matching the search keyword with the match field; and if matching of a match field of a current-level logical flow table is completed, executing a corresponding instruction, and if the current-level logical flow table is not a last-level logical flow table or there is an instruction for executing an action, executing a corresponding action.

It should be noted that the multi-level logical flow table in this embodiment of the application is in contrast with a multi-level flow table including multiple physical flow tables in the prior art. The so-called multi-level logical flow table is formed by cascading logical flow tables, which are obtained by configuring physical flow tables according to the flow-table match-field configuration information involved in the foregoing embodiment. A reason for calling a logical flow table is that a function that a single logical flow table can implement, for example, a match field of the logical flow table is used to match matching information of a data packet, is the same as a function that a single physical flow table can implement; however, no physical storage space is allocated to a single logical flow table; instead, all logical flow tables share one storage space allocated to a physical flow table. Cascading of multiple logical flow tables (that is, a multi-level logical flow table) is also similar to cascading of multiple physical flow tables, for example, in both cases, after a flow table is searched, an ID in the flow table is used to indicate a next flow table to be searched.

In this embodiment of the application, executing of an instruction includes modifying an action for data, skipping between flow tables, and the like; and executing of an action is an operation performed dedicatedly for a data packet, for example, discarding or forwarding a data packet. If the matching of the match field of the current-level logical flow table is completed and the current-level logical flow table is the last-level logical flow table, a processing procedure for the data packet ends. After the match field of the first-level logical flow table in the multi-level logical flow table is searched for and the search keyword is matched with the match field, methods similar to the methods for searching for the match field of the first-level logical flow table in the multi-level logical flow table and matching the search keyword with the match field may be used to search for a match field of a second-level logical flow table in the multi-level logical flow table and match the search keyword with the match field, and this proceeds until a match field of a last-level logical flow table is searched for and matched. In the prior art, an action (action) of a multi-level flow table pipeline can be executed only after matching of a match field of a last-level flow table is completed, and there are some restrictions on repeated execution of an action by hardware. In contrast, in the method provided in this embodiment of the application, because a single logical flow table in a multi-level logical flow table is configurable and a flow table is divided, a multi-level flow table pipeline can be implemented well, and repeated execution of an action can also be implemented.

After the corresponding instruction and action are executed, further, the extracted matching information of the data packet may be modified. If an operation is performed on a header of the data packet in a process of executing matching of a match field of a flow table, for example, the header of the data packet is modified, some of the previously extracted matching information of the data packet becomes invalid. In this case, all matching information of the data packet does not need to be extracted again, but only some invalid matching information needs to be modified accordingly.

It can be seen from the multi-level flow table search method provided in the foregoing embodiment of the application that, a match field, which is to be matched with matching information of a data packet, in a physical flow table may be identified by using flow-table match-field configuration information; because the flow-table match-field configuration information can be modified according to a requirement by using software, the match field in the physical flow table does not need to be modified, and multiple logical flow tables can be obtained to form a multi-level flow table, so that a keyword generated according to the flow-table match-field configuration information is matched with a match field of each-level flow table in the multi-level flow table. Compared with the prior art in which each single flow table in a multi-level flow table has a fixed match field and hardware logic needs to be modified each time a match field is changed, in the method provided in this embodiment of the application, because flow-table match-field configuration information can be configured by using software, a generated keyword is also changeable. This is equivalent to that a physical flow table becomes a logical flow table, and a fixed match field becomes a changeable match field. Therefore, flexibility of a flow table match field is improved, and costs incurred by modifying hardware logic when a match field is changed are reduced.

For the foregoing embodiment, an embodiment of the selecting a keyword from the matching information of the data packet according to flow-table match-field configuration information in the application may be: determining matching information, which is used for flow table match field matching, in the matching information of the data packet according to the flow-table match-field configuration information represented by a bitmap, and forming the keyword by using the determined matching information; and optionally may be: determining several pieces of matching information, which are used for flow table match field matching, in all the matching information of the data packet according to the flow-table match-field configuration information represented by a bitmap, and forming the keyword by using the determined several pieces of matching information, so as to use the keyword as a search keyword to match a match field, which is configured according to the flow-table match-field configuration information, in the physical flow table.

In order to describe the foregoing embodiment of the determining several pieces of matching information, which are used for flow table match field matching, in all the matching information of the data packet according to the flow-table match-field configuration information represented by a bitmap, and forming the keyword by using the determined several pieces of matching information, an example is used in the following for further description.

It is assumed that when the data packet is received, all the matching information, such as a MAC address, a VLAN ID, an IP address, and a port number, of the data packet is extracted. When the flow-table match-field configuration information is represented by a bitmap, "1" is used to indicate that a keyword generated by selecting several pieces of matching information from all the matching information according to the flow-table match-field configuration information is valid, and "0" is used to indicate that a keyword generated by selecting several pieces of matching information from all the matching information according to the flow-table match-field configuration information is invalid. Because a match field, which is to be matched with the selected matching information, in a physical flow table is also indicated in the flow-table match-field configuration information, in the flow-table match-field configuration information represented by a bitmap, "1" also indicates a match field, which is to be matched with the selected matching information, in a physical flow table, and "0" indicates a match field, which is not to be matched with the selected matching information, in a physical flow table, that is, the match field in the physical flow table is masked. As shown in FIG. 1-b, that all the matching information of the data packet is a MAC address, a VLAN ID, an IP address, and a port number is used as an example. It is assumed that the flow-table match-field configuration information represented by a bitmap is "1001", and match fields in a physical flow table include a match field 1, a match field 2, a match field 3, and a match field 4, which correspondingly include content: a MAC address, a VLAN ID, an IP address, and a port number respectively. According to the foregoing meanings of "1" and "0" in the flow-table match-field configuration information represented by a bitmap, it indicates that among the four pieces of matching information: the MAC address, the VLAN ID, the IP address, and the port number, the MAC address and the port number are selected as a search keyword to be matched with the match field 1 and the match field 4 in the physical flow table, while the match field 3 and the match field 4 in the physical flow table are masked and are not involved in matching of the matching information of the data packet. If a match field, which is to be matched with the matching information, in a physical flow table needs to be modified, in this embodiment of the application, hardware logic does not need to be modified to obtain a new physical flow table, but only the flow-table match-field configuration information needs to be modified. For example, if match fields, which are to be matched with the matching information, in the physical flow table need to be changed from the match field 1 and the match field 4, which are originally used for matching, to the match field 2 and the match field 4, only the foregoing flow-table match-field configuration information represented by a bitmap needs to be changed to "0101". In this way, according to the modified flow-table match-field configuration information, among the four pieces of matching information: the MAC address, the VLAN ID, the IP address, and the port number, the VLAN ID and the port number are selected as a search keyword to be matched with the match field 2 and the match field 4 in the physical flow table, as shown in FIG. 1-c.

For the foregoing embodiment, another embodiment of the selecting a keyword from the matching information of the data packet according to flow-table match-field configuration information in the application may be: determining matching information, which is used for flow table match field matching, in the matching information of the data packet according to the flow-table match-field configuration information represented by fixed code, and forming the keyword by using the determined matching information; and optionally may be: determining several pieces of matching information, which are used for flow table match field matching, in all the matching information of the data packet according to the flow-table match-field configuration information represented by fixed code, and forming the keyword by using the determined several pieces of matching information, so as to use the keyword as a search keyword to match a match field, which is configured according to the flow-table match-field configuration information, in the physical flow table.

In order to describe the foregoing embodiment of the determining several pieces of matching information, which are used for flow table match field matching, in all the matching information of the data packet according to the flow-table match-field configuration information represented by fixed code, and forming the keyword by using the determined several pieces of matching information, an example is used in the following for further description.

It is assumed that when the data packet is received, all the matching information, such as a MAC address, a VLAN ID, an IP address, and a port number, of the data packet is extracted. When the flow-table match-field configuration information is represented by fixed code, it indicates that a keyword generated by selecting several pieces of matching information from all the matching information according to the flow-table match-field configuration information is corresponding to the fixed code. Because a match field, which is to be matched with the selected matching information, in a physical flow table is also indicated in the flow-table match-field configuration information, a match field, which is to be matched with the selected matching information, in a physical flow table is also indicated in the flow-table match-field configuration information represented by fixed code. As shown in FIG. 1-d, that all the matching information of the data packet is a MAC address, a VLAN ID, an IP address, and a port number is used as an example. It is assumed that the flow-table match-field configuration information represented by fixed code is "0x15", which is corresponding to keywords "MAC address" and "port number" that are generated by selecting several pieces of matching information from all the matching information. Match fields in a physical flow table include a match field 1, a match field 2, a match field 3, and a match field 4, which correspondingly include content: a MAC address, a VLAN ID, an IP address, and a port number respectively. According to the foregoing meaning of the flow-table match-field configuration information represented by fixed code, it indicates that among the four pieces of matching information: the MAC address, the VLAN ID, the IP address, and the port number, "the MAC address" and "the port number" are selected as a search keyword to be matched with the match field 1 and the match field 4 in the physical flow table. If a match field, which is to be matched with the matching information, in a physical flow table needs to be modified, in this embodiment of the application, hardware logic does not need to be modified to obtain a new physical flow table, but only the flow-table match-field configuration information needs to be modified. For example, if match fields, which are to be matched with the matching information, in the physical flow table need to be changed from the match field 1 and the match field 4, which are originally used for matching, to the match field 2 and the match field 4, only the foregoing flow-table match-field configuration information represented by fixed code "0x15" needs to be modified, for example, modified to "0x24". In this way, according to the modified flow-table match-field configuration information, among the four pieces of matching information: the MAC address, the VLAN ID, the IP address, and the port number, the VLAN ID and the port number are selected as a search keyword to be matched with the match field 2 and the match field 4 in the physical flow table, as shown in FIG. 1-e.

Without loss of generality, for the foregoing extracted matching information, such as the MAC address, the VLAN ID, the IP address, and the port number, of the data packet, if the flow-table match-field configuration information represented by a bitmap is, for example, "1010" ("1" indicates that the bit is valid, and "0" indicates that the bit is invalid), the search keyword is a combination of the MAC address and the IP address, and is used for matching match fields, which include the content: the MAC address and the IP address respectively, in the physical flow table. For the foregoing extracted matching information, such as the MAC address, the VLAN ID, the IP address, and an ACL rule, of the data packet, if the flow-table match-field configuration information represented by fixed code is, for example, "0x13", the search keyword is a combination of the MAC address and the IP address, and a formed search keyword may be a combination of the MAC address, the IP address, and the like.

FIG. 2 is a schematic structural diagram of a multi-level flow table search apparatus according to an embodiment of the application. For ease of description, only a part related to this embodiment of the application is shown. The multi-level flow table search apparatus shown in FIG. 2 includes an extracting module 201, a keyword generating module 202, a search module 203, and an executing module 204.

The extracting module 201 is configured to extract matching information of a data packet when the data packet is received.

Matching information of a data packet is information, which is to be matched with content of a match field in a flow table, in the data packet. The so-called flow table includes multiple flow entries, and each flow entry is a forwarding rule. For a data packet entering a switch, a forwarding destination port is obtained by querying a flow table. A flow entry includes a header field, a counter, and an operation. The header field, which is an information tuple such as a quintet, is an identifier of the flow entry, and is also a match field of a flow table. Content of the header field is specific information to be matched with extracted matching information of a data packet. The counter is used to collect statistical data of the flow entry. The operation specifies an operation that should be executed on a data packet matching the flow entry. In the prior art, matching information of a data packet is extracted according to a fixed match field of a single flow table each time; therefore, extraction needs to be performed for multiple times. In contrast, in this embodiment of the application, as an exemplary embodiment, the extracting module 201 may extract all the matching information of the data packet when the data packet is received, where all the matching information may exist in a form of a data structure.

The keyword generating module 202 is configured to select a keyword from the matching information of the data packet according to flow-table match-field configuration information.

In the prior art, a match field of each flow table in a multi-level flow table is fixed; as reflected in hardware, fixed storage spaces are allocated to match fields of these flow tables. If a match field of a flow table needs to be changed, hardware logic needs to be modified, for example, an overall storage space is reallocated, which undoubtedly increases costs. For example, in a multi-level flow table that includes three flow tables, specific content of a match field of a first-level flow table is an IP; specific content of a match field of a second-level flow table is a MAC address; and specific content of a match field of a third-level flow table is a VLAN ID. If the specific content of the match field of the first-level flow table needs to be changed to a port number, this can be implemented only by modifying specific hardware logic, for example, re-modifying a storage space originally allocated to the match field of the first-level flow table.

In this embodiment of the application, a storage space is allocated to a match field in each flow table, and once allocation of the storage space is completed, the match field remains unchanged unless hardware logic is modified; however, a match field, which is to be matched with matching information of a data packet, in a flow table may be identified by using software, and this action is completed by using flow-table match-field configuration information in this embodiment of the application. The flow-table match-field configuration information may be configured by using software, and therefore, although the match field of the flow table is fixed, the match field, which is to be matched with the matching information of the data packet, in the flow table can be changed according to a change of the flow-table match-field configuration information. It should be noted that both a flow table in the prior art and a "flow table" involved in identifying a match field, which is to be matched with matching information of a data packet, in the flow table by using software in this embodiment of the application are physical flow tables, that is, a physical flow table is corresponding to a fixed physical storage space. In this respect, the flow-table match-field configuration information mentioned in this embodiment of the application is specifically used to identify a match field, which is to be matched with selected matching information, in a physical flow table by using software.

When the extracting module 201 extracts the matching information of the data packet when the data packet is received, and the flow-table match-field configuration information is used to identify a match field, which is to be matched with selected matching information, in a physical flow table by using software, an embodiment in which the keyword generating module 202 selects the keyword from the matching information of the data packet according to the flow-table match-field configuration information may be: generating the keyword by selecting several pieces of matching information from all the matching information of the data packet according to the flow-table match-field configuration information.

The search module 203 is configured to search for a match field of each-level flow table in a multi-level flow table starting from a first-level flow table in the multi-level flow table by using the keyword as a search keyword, and match the search keyword with the match field.

The executing module 204 is configured to: if matching of a match field of a current-level flow table is completed, execute a corresponding instruction, and if the current-level flow table is not a last-level flow table or there is an instruction for executing an action, execute a corresponding action.

When the extracting module 201 extracts the matching information of the data packet when the data packet is received, the flow-table match-field configuration information is used to identify the match field, which is to be matched with the selected matching information, in the physical flow table by using the software, and the keyword generating module 202 generates the keyword by selecting the several pieces of matching information from all the matching information of the data packet according to the flow-table match-field configuration information, the search module 203 is specifically configured to search for a match field of each-level logical flow table in a multi-level logical flow table starting from a first-level logical flow table in the multi-level logical flow table by using the keyword generated by the keyword generating module 202 as a search keyword, and match the search keyword with the match field; and the executing module 204 is specifically configured to: if matching of a match field of a current-level logical flow table is completed, execute a corresponding instruction, and if the current-level logical flow table is not a last-level logical flow table or there is an instruction for executing an action, execute a corresponding action.

It should be noted that in the multi-level flow table search apparatus shown in FIG. 2, the multi-level logical flow table is in contrast with a multi-level flow table including multiple physical flow tables in the prior art. The so-called multi-level logical flow table is formed by cascading logical flow tables, which are obtained by configuring physical flow tables according to the flow-table match-field configuration information involved in the foregoing embodiment. A reason for calling a logical flow table is that a function that a single logical flow table can implement, for example, a match field of the logical flow table is used to match matching information of a data packet, is the same as a function that a single physical flow table can implement; however, no physical storage space is allocated to a single logical flow table; instead, all logical flow tables share one storage space allocated to a physical flow table. Cascading of multiple logical flow tables (that is, a multi-level logical flow table) is also similar to cascading of multiple physical flow tables, for example, in both cases, after a flow table is searched, an ID in the flow table is used to indicate a next flow table to be searched. Executing of an instruction includes modifying an action for data, skipping between flow tables, and the like; and executing of an action is an operation performed dedicatedly for a data packet, for example, discarding or forwarding a data packet. If the matching of the match field of the current-level logical flow table is completed and the current-level logical flow table is the last-level logical flow table, a processing procedure for the data packet ends. After the match field of the first-level logical flow table in the multi-level logical flow table is searched for and the search keyword is matched with the match field, methods similar to the methods for searching for the match field of the first-level logical flow table in the multi-level logical flow table and matching the search keyword with the match field may be used to search for a match field of a second-level logical flow table in the multi-level logical flow table and match the search keyword with the match field, and this proceeds until a match field of a last-level logical flow table is searched for and matched. In the prior art, an action of a multi-level flow table pipeline can be executed only after matching of a match field of a last-level flow table is completed, and there are some restrictions on repeated execution of an action by hardware. In contrast, in the apparatus provided in this embodiment of the application, because a single logical flow table in a multi-level logical flow table is configurable and a flow table is divided, a multi-level flow table pipeline can be implemented well, and repeated execution of an action can also be implemented.

It should be noted that in the implementation manner of the multi-level flow table search apparatus shown in FIG. 2, division of the functional modules is merely exemplary. In an actual application, according to a requirement such as a corresponding hardware configuration requirement or consideration of convenient implementation of software, the foregoing functions may be allocated to different functional modules for implementation, that is, an inner structure of the multi-level flow table search apparatus is divided into different functional modules, so as to implement some or all of the foregoing described functions. In addition, in an actual application, a corresponding functional module in this embodiment may be implemented by corresponding hardware, or may be implemented by corresponding hardware executing corresponding software. For example, the foregoing extracting module may be hardware having the foregoing function of executing the extracting of matching information of a data packet when the data packet is received, for example, an extractor, or may be a general processor or another hardware device capable of executing a corresponding computer program to implement the foregoing function. For another example, the foregoing keyword generating module may be hardware having the foregoing function of selecting a keyword from the matching information of the data packet according to flow-table match-field configuration information, for example, a keyword generator, or may be a general processor or another hardware device capable of executing a corresponding computer program to implement the foregoing function (the foregoing description rule applies to all the embodiments provided in this specification).

It can be seen from the foregoing multi-level flow table search apparatus shown in FIG. 2, because flow-table match-field configuration information is information that can be modified according to a requirement by using software, hardware logic does not need to be modified to change a flow table match field, and a keyword generated according to the flow-table match-field configuration information is matched with a match field in each-level flow table in the multi-level flow table. Compared with the prior art in which each single flow table in a multi-level flow table has a fixed match field and hardware logic needs to be modified each time a match field is changed, in the apparatus provided in this embodiment of the application, because flow-table match-field configuration information can be configured by using software, a fixed match field becomes a changeable match field. Therefore, flexibility of a flow table match field is improved, and costs incurred by modifying hardware logic when a match field is changed are reduced.

In a multi-level flow table pipeline in the prior art, each flow table has an independent search unit. Because logical functions of search units are similar to some degree, some logical resources are wasted. In the multi-level flow table search apparatus shown in FIG. 2, a multi-level flow table is searched cyclically; although a match field of each flow table is configured by using software, searches are performed in a same module, which can implement sharing of one search module 203 among tables with different match fields and save some logical resources.

The multi-level flow table search apparatus shown in FIG. 2 may further include a modifying module 301, as shown in FIG. 3 showing a multi-level flow table search apparatus according to another embodiment of the application. The modifying module 301 modifies the matching information, which is extracted by the extracting module 201, of the data packet.

In the multi-level flow table search apparatus shown in any one of FIG. 2 and FIG. 3, the keyword generating module 202 includes a first determining unit 401 and a first combining unit 402, which are as shown in a multi-level flow table search apparatus shown in any one of FIG. 4-a and FIG. 4-b.

The first determining unit 401 is configured to determine matching information, which is used for flow table match field matching, in the matching information of the data packet according to the flow-table match-field configuration information represented by a bitmap; and the first combining unit 402 is configured to form the keyword by using the determined matching information.

In the multi-level flow table search apparatus shown in any one of FIG. 4-a and FIG. 4-b, for the execution of the first determining unit 401 and the first combining unit 402, reference may be made to the foregoing method embodiments corresponding to FIG. 1-b and FIG. 1-c, and beneficial effects of the first determining unit 401 and the first combining unit 402 are the same as those of the method embodiments corresponding to FIG. 1-b and FIG. 1-c, and are not described again herein.

In the multi-level flow table search apparatus shown in any one of FIG. 2 and FIG. 3, the keyword generating module 202 includes a second determining unit 501 and a second combining unit 502, which are as shown in a multi-level flow table search apparatus shown in any one of FIG. 5-a and FIG. 5-b.

The second determining unit 501 is configured to determine matching information, which is used for flow table match field matching, in the matching information of the data packet according to the flow-table match-field configuration information represented by fixed code; and the second combining unit 502 is configured to form the keyword by using the determined matching information.

In the multi-level flow table search apparatus shown in any one of FIG. 5-a and FIG. 5-b, for the execution of the second determining unit 501 and the second combining unit 502, reference may be made to the foregoing method embodiments corresponding to FIG. 1-d and FIG. 1-e, and beneficial effects of the second determining unit 501 and the second combining unit 502 are the same as those of the method embodiments corresponding to FIG. 1-d and FIG. 1-e, and are not described again herein.

An embodiment of the application further provides a multi-level flow table search device. The device includes a memory and one or more programs, where the one or more programs are stored in the memory, and are configured to be executed by one or more processors, and the one or more programs include instructions for performing the following operations:

extracting matching information of a data packet when the data packet is received;

selecting a keyword from the matching information of the data packet according to flow-table match-field configuration information;

searching for a match field of each-level flow table in a multi-level flow table starting from a first-level flow table in the multi-level flow table by using the keyword as a search keyword, and matching the search keyword with the match field; and if matching of a match field of a current-level flow table is completed, executing a corresponding instruction, and if the current-level flow table is not a last-level flow table or there is an instruction for executing an action, executing a corresponding action.

Assuming that the foregoing is a first possible implementation manner, in a second possible implementation manner provided based on the first possible implementation manner, the memory of the device further includes an instruction for performing the following operation:

modifying the extracted matching information of the data packet.

In a third possible implementation manner provided based on the first or second possible implementation manner, the memory of the device further includes instructions for performing the following operations:

determining matching information, which is used for flow table match field matching, in the matching information of the data packet according to the flow-table match-field configuration information represented by a bitmap; and forming the keyword by using the determined matching information.

In a fourth possible implementation manner provided based on the first or second possible implementation manner, the memory of the device further includes instructions for performing the following operations:

determining matching information, which is used for flow table match field matching, in the matching information of the data packet according to the flow-table match-field configuration information represented by fixed code; and forming the keyword by using the determined matching information.

As another aspect, another embodiment of the application further provides a computer readable storage medium, where the computer readable storage medium may be a computer readable storage medium included in the memory in the foregoing embodiment, or may be a computer readable storage medium that exists independently and is not installed into a terminal. The computer readable storage medium stores one or more programs, where the one or more programs are executed by one or more processors to execute a multi-level flow table search method. The method includes:

extracting matching information of a data packet when the data packet is received;

selecting a keyword from the matching information of the data packet according to flow-table match-field configuration information;

searching for a match field of each-level flow table in a multi-level flow table starting from a first-level flow table in the multi-level flow table by using the keyword as a search keyword, and matching the search keyword with the match field; and if matching of a match field of a current-level flow table is completed, executing a corresponding instruction, and if the current-level flow table is not a last-level flow table or there is an instruction for executing an action, executing a corresponding action.

Assuming that the foregoing is a first possible implementation manner, in a second possible implementation manner provided based on the first possible implementation manner, after the executing a corresponding instruction and action, the method further includes:

modifying the extracted matching information of the data packet.

In a third possible implementation manner provided based on the first or second possible implementation manner, the selecting a keyword from the matching information of the data packet according to flow-table match-field configuration information includes:

determining matching information, which is used for flow table match field matching, in the matching information of the data packet according to the flow-table match-field configuration information represented by a bitmap; and forming the keyword by using the determined matching information.

In a fourth possible implementation manner provided based on the first or second possible implementation manner, the selecting a keyword from the matching information of the data packet according to flow-table match-field configuration information includes:

determining matching information, which is used for flow table match field matching, in the matching information of the data packet according to the flow-table match-field configuration information represented by fixed code; and forming the keyword by using the determined matching information.

It should be noted that content such as information exchange between the modules/units of the apparatus and the execution processes thereof is based on the same idea as the method embodiments of the application, and produces the same technical effects as the method embodiments of the application. For specific content, reference may be made to the description in the method embodiments of the application, and details are not described herein again.

A person of ordinary skill in the art may understand that all or some of the methods in the foregoing embodiments may be implemented by a program instructing relevant hardware. The program may be stored in a computer-readable storage medium. The storage medium may include: a read-only memory (ROM), a random access memory (RAM), a magnetic disk, or an optical disc.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the application.

The multi-level flow table search method and apparatus provided in the embodiments of the application are described above in detail. Specific examples are used in this specification to describe the principle and implementation manners of the application, but the foregoing descriptions of the embodiments are merely intended to facilitate understanding of the method and core idea of the application. Meanwhile, a person of ordinary skill in the art may make modifications to the specific implementation manners and application scope according to the idea of the application. In conclusion, the content of this specification shall not be understood as a limitation on the application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus, comprising:
one or more processors; and
a computer-readable non-transitory storage medium storing a program to be executed by the one or more processors, the program including instructions for:
extracting matching information of a data packet in response to receiving the data packet;
determining matching information for flow table match field matching, in the matching information of the data packet according to flow-table match-field configuration information, the flow-table match-field configuration information being represented by a bitmap;
forming the keyword using the determined matching information;
searching for a match field of each-level flow table in a multi-level flow table starting from a first-level flow table in the multi-level flow table using the keyword as a search keyword, and matching the search keyword with the match field of each-level flow table; and
in response to matching a match field of a current-level flow table, executing a corresponding instruction, and in response to the current-level flow table not being a last-level flow table, or in response to an instruction for executing an action, executing a corresponding action.

2. The apparatus according to claim 1, wherein the program further includes instructions for modifying the extracted matching information of the data packet.

3. A method, comprising:
   extracting matching information of a data packet in response to receiving the data packet;
   selecting a keyword from the matching information of the data packet according to flow-table match-field configuration information, wherein the selecting a keyword from the matching information of the data packet comprises:
      determining matching information for flow table match field matching in the matching information of the data packet according to the flow-table match-field configuration information, the flow-table match-field configuration information being represented by fixed code; and
      forming the keyword using the determined matching information;
   searching for a match field of each-level flow table in a multi-level flow table starting from a first-level flow table in the multi-level flow table using the keyword as a search keyword, and matching the search keyword with the match field of each-level flow table; and
   in response to matching a match field of a current-level flow table, executing a corresponding instruction, and in response to the current-level flow table not being a last-level flow table, executing a corresponding action.

4. The method according to claim 3, wherein after executing the corresponding instruction and action, the method further comprises:
   modifying the extracted matching information of the data packet.

5. An apparatus, comprising:
   one or more processors; and
   a computer-readable non-transitory storage medium storing a program to be executed by the one or more processors, the program including instructions for:
      extracting matching information of a data packet in response to receiving the data packet;
      determining matching information for flow table match field matching, in the matching information of the data packet, according to flow-table match-field configuration information, the flow-table match-field configuration information being represented by fixed code; and
      forming the keyword using the determined matching information;
      searching for a match field of each-level flow table in a multi-level flow table starting from a first-level flow table in the multi-level flow table using the keyword as a search keyword, and matching the search keyword with the match field of each-level flow table; and
      in response to matching a match field of a current-level flow table, executing a corresponding instruction, and in response to the current-level flow table not being a last-level flow table, or in response to an instruction for executing an action, executing a corresponding action.

6. The apparatus according to claim 5, wherein the program further includes instructions for modifying the extracted matching information of the data packet.

* * * * *